United States Patent
Tronc et al.

[11] 3,784,873
[45] Jan. 8, 1974

[54] DEVICE FOR BUNCHING THE PARTICLES OF A BEAM, AND LINEAR ACCELERATOR COMPRISING SAID DEVICE

[75] Inventors: Dominique Tronc; Hubert Leboutet, both of Paris, France

[73] Assignee: Thomson-CSF, Paris, France

[22] Filed: Oct. 22, 1971

[21] Appl. No.: 191,763

[30] Foreign Application Priority Data
Oct. 30, 1970 France .......................... 70.39261

[52] U.S. Cl. .............. 315/5.41, 315/3.5, 315/5.42
[51] Int. Cl. ............................................. H01j 25/10
[58] Field of Search .................. 315/3.5, 5.41, 5.42

[56] References Cited
UNITED STATES PATENTS

| | | | |
|---|---|---|---|
| 2,813,996 | 11/1957 | Chodorow | 315/5.42 |
| 3,546,524 | 12/1970 | Stark | 315/5.41 |
| 3,454,818 | 7/1969 | Soffer et al. | 315/5.41 |
| 2,925,522 | 2/1960 | Kelliher | 315/5.42 |
| 2,940,001 | 6/1960 | Post | 315/5.42 |
| 3,011,087 | 11/1961 | Jeppson et al. | 315/5.42 |
| 3,070,726 | 12/1962 | Mallory | 315/5.42 |
| 3,011,086 | 11/1961 | Post | 315/5.42 |
| 3,333,142 | 7/1967 | Takeda et al. | 315/5.42 |

*Primary Examiner*—Rudolf V. Rolinec
*Assistant Examiner*—Saxfield Chatman, Jr.
*Attorney*—Cushman, Darby et al.

[57] ABSTRACT

The bunching device in accordance with the invention is essentially constituted by a cylindrical cavity resonator, which advantageously replaces the conventional device encountered in linear accelerators, including a velocity-modulation cavity for modulating the particles and a drift space for bunching said particles.

The length of this bunching cavity is associated with the velocity of the particles in said cavity and with the operating frequency of the accelerator.

A device of this kind, which is of small size and low cost, renders unnecessary the conventional control of amplitude and phase of the signals which are injected into the bunching device and the accelerator structure, which are coupled in a direct manner. Furthermore, it enables operation to be carried out under conditions of heavy current, whilst achieving good efficiency.

5 Claims, 3 Drawing Figures

DEVICE FOR BUNCHING THE PARTICLES OF A BEAM, AND LINEAR ACCELERATOR COMPRISING SAID DEVICE

Linear accelerators generally employ continuous beams in which the particles are bunched in tight and dense bunches before passing through an accelerator structure.

Generally, the bunching of particles is achieved by the successive actions of :

a beam "chopper" which eliminates those parts of the beam which ultimately cause interference ;

an HF cavity which velocity-modulates the beam ;

a drift space which enables said velocity-modulation to be converted to density-modulation.

The drawbacks of this succession of devices are manifold and include in particular the necessity of regulating the strengths of the electromagnetic fields, and the relative phases at different points in the beam trajectory, and thus of using bulky and expensive equipment. Moreover, the presence of a drift space (prejudicial to good transverse bunching of the particles when the beam current is high) and the fact that it is impossible to modify the length of this drift space restricts the application of the accelerator.

The object of the present invention is a device which overcomes these drawbacks and, more particularly, a device for bunching particles of a beam, comprising : at least one bunching cylindrical cavity resonator tuned to the operating frequency f, said bunching cavity having an entry face and an exit face, said entry and exit face being axially spaced and respectively provided with an axial aperture for the passage therethrough of said particle beam, means for feeding high power energy to said bunching cavity ; said entry and exit faces being separated by the distance :

$$L = n\ (v/f)$$

where : $v$ is the mean velocity of said particles expressed in $m/s$ ;

$f$ the operating frequency of said bunching cavity , expressed in GHz ;

and $n$ a numerical factor ranging between 0.5 and 1.5.

The invention also relates to a linear particle accelerator comprising a source of particles for emitting a particle beam, an accelerating structure comprising a plurality of cavity resonators in series, coupled to each other and provided with apertures for the passage therethrough of said particle beam, the previously mentioned bunching cavity being coupled to the first cavity resonator of said accelerating structure.

The invention will be better understood and other of its features rendered apparent, from a consideration of the ensuing description and the accompanying drawings in which :

FIG. 1 schematically illustrates a linear travelling wave accelerator equipped with a bunching device in accordance with the invention ;

Figure 1:
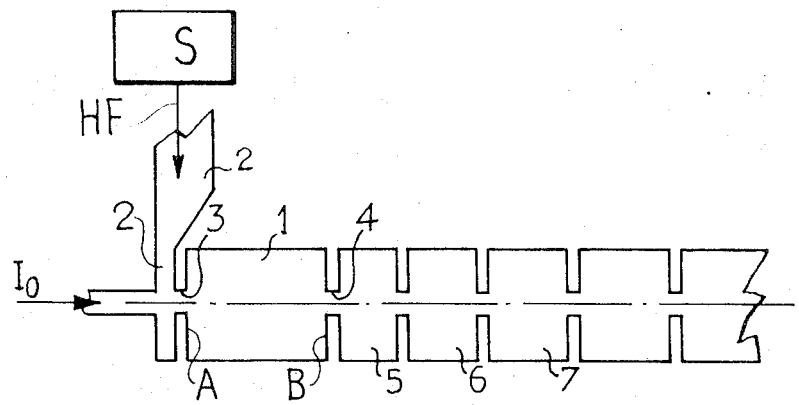

FIG. 1 schematically illustrates a linear, travelling wave particle accelerator comprising a "bunching cavity" 1, in accordance with the invention. This "bunching cavity" 1, which is a cylinder axially limited by an entry face A and an exit face B, is coupled to an HF generator by means input coupler 2 and an aperture 3 or iris diaphragm drilled in the entry face A and to the first cavity 5 of the series of cavities 5, 6, 7 . . . . which form the conventionnal structure of the accelerator.

The length L of the "bunching cavity" 1 correspond to a phase shift sensibly equal to $3\pi/2$, considering the central particle of a bunch which is building up at entry face A.

In operation, a particle beam $I_o$, having same axis that series of cavity resonators, passes through the input coupler 2 and enters the "bunching cavity" 1 through the iris 3 and is subjected to the HF electromagnetic field excited in this "bunching cavity" 1.

The particles passing through said cavity successively experience velocity-modulation and density-modulation due to the cumulative effect of the electromagnetic field which acts upon them over their trajectory. It is therefore unnecessary to follow the "bunching cavity" 1 by a drift space, this constitutes a substantial advantage of the device.

Moreover, a linear accelerator operating the travelling wave mode and equipped with the bunching device in accordance with the invention, only requires one HF input, associated to the "bunching cavity" 1, which is then acting as the first element of the series of cavity resonators which together make up the accelerator structure. Control of the phase is thus achieved quite simply by suitable choice of the dimensions of said cavities.

An example will better illustrate the advantages of the device.

The "bunching cavity" 1, as shown in Fig. 1, constitutes a transition between the input HF coupler 2 assocaited to an HF generator and the accelerator structure consitituted by the cavities 5, 6, 7 . . . No phase-regulating device is required. The length L of the "bunching cavity" 1 corresponding for an operating frequency of 3 GHz and a mean particle (electrons) velocity of $c/2$, where $c$ is the light velocity, is :

$$L = n\ (v/f) = 2.5\ cm.\ with\ n = 0,5.$$

The electrons are injected at an energy in the order of 40 Kev for example.

It is worthy of note that this distance is much shorter than that encountered in the conventional bunching devices and which, in addition to the velocity-modulation cavity, the size of which is substantial includes a drift space having a length in the order of one wavelength at modulating voltages in the order $\pm 5$ to $\pm 8$ Kvolts.

When the current increases, the space charge becomes very important, and the transverse unbunching through the drift space increases correspondingly.

Under conditions of high current, the present invention provides excellent results since it dispenses with the need for said drift space.

Moreover, a "chopper" is no longer needed because the electromagnetic field prevailling in the "bunching cavity" 1 eliminates the occurrence of unwanted particles.

Figure 2:
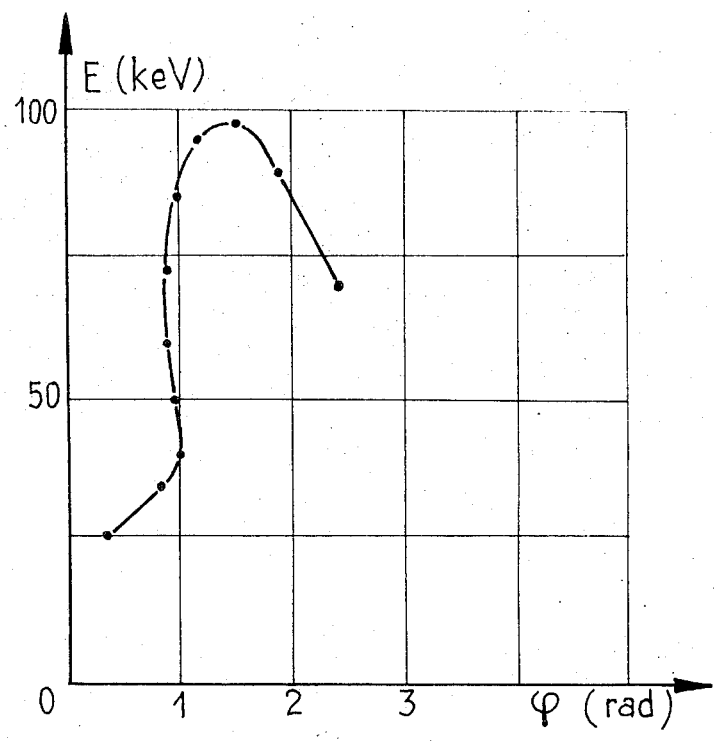
FIG. 2 illustrates variations in power as a function of phase, at the output of the bunching cavity.

FIG. 2, which applies to the case of an electron beam entering the bunching cavity 1 in accordance with the invention, aat a power of 40 Kev, illustrates the variations in phase as a function of the beam power in the exit plane of said "bunching cavity" 1, the latter's length corresponding approximately to a phase shift of $3\pi/2$.

Figure 3:
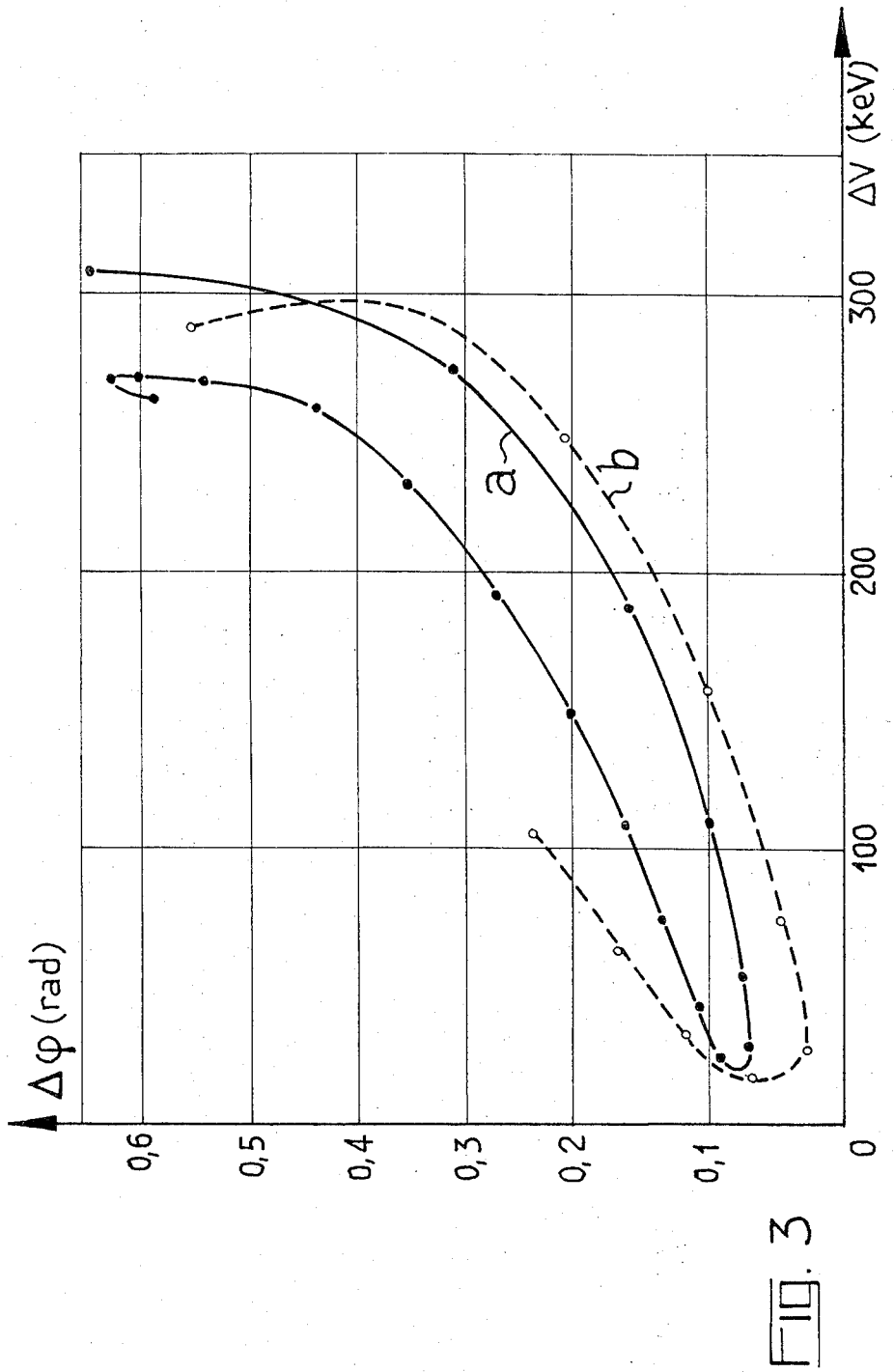
FIG. 3 illustrates the phase-power diagram at the output of an accelerator provided with a bunching device in accordance with the invention (curve a) and at the output of a linear accelerator which does not comprise preliminary bunching device (curve b).

FIG. 3, curve $a$ illustrates the phase-power graph at the output of a conventional accelerator structure preceded by a bunching device in accordance with the invention.

FIG. 3, curve $b$, by way of comparison, illustrates the phase-power graph at the output of the same accelerator structure when used on its own.

It will be seen that the addition of the "bunching cavity" 1 to a conventional accelerator structure, doubles the effective current whilst much improving the "energy-phase" concentration, that is to say the beam properties at exit from the accelerator.

If the phase-energy curve of an accelerator equipped with a preliminary bunching device of conventional kind is close to the curve $a$, where the space charge is very weak, this is certainly not the case when the current is high. In the latter case, a device in accordance with the invention is very advantageous.

In the embodiment chosen, the accelerator operates in the travelling wave mode but the device in accordance with the invention can equally well be used in an accelerator operating in the standing wave mode. In this case, the hyperfrequency energy can be injected in the first resonant cavity of the accelerating structure, the "bunching cavity" being electromagnetically coupled to this first cavity in a direct manner.

The invention is not limited to the examples described and illustrated here. In particular, it is possible to improve the bunching of the particles by placing before the accelerator structure, two "bunching cavities" which are coupled with one another.

We claim:

1. A device for bunching particles of a beam, comprising:
    a source of particles for emitting the particles,
    an accelerating structure including a plurality of cavity resonators in series coupled to each other and provided with apertures for the passage therethrough of the particle beam,
    at least one bunching cylindrical cavity resonator coupled to the first cavity resonator of the accelerator structure tuned to the operating frequency $f$, said bunching cavity having an entry face and an exit face said entry and exit faces being axially spaced and respectively provided with an axial aperture for the passage therethrough of said particle beam, means for feeding high power energy to said bunching cavity;
    said entry and exit faces being separated by the distance:

$$L = n \ (v/f)$$

where: $v$ is the mean velocity of said particles expressed in $m/s$;
$f$ the operating frequency of said bunching cavity, expressed in GHz; and
$n$ a numerical factor ranging between 0.5 and 1.5.

2. A linear accelerator as claimed in claim 1, wherein said bunching resonator is adjacent to the first cavity resonator of said structure and electromagnetically coupled thereto and has a common wall therewith, said common wall having a coupling aperture formed therein.

3. A linear accelerator as claimed in claim 1, wherein said source is an electron source comprising means for accelerating said electrons at the input of said bunching resonator to a velocity $v$ equal to $c/2$, $c$ being the light velocity, said entry and exit faces being separated by a distance $L = c/4 f$ with $n = 0.5$.

4. A linear accelerator as claimed in claim 1, wherein said high-frequency energy feeding means are coupled to said entry face of said bunching cavity resonator.

5. A linear accelerator as claimed in claim 1, wherein said high-frequency energy feeding means are coupled to one of said cavity resonators of accelerating structure.

* * * * *